Aug. 9, 1932.  J. D. CARTIN  1,871,155

AIR BRAKE

Filed Oct. 9, 1930

Inventor
James D. Cartin

Attorneys

Patented Aug. 9, 1932

1,871,155

UNITED STATES PATENT OFFICE

JAMES D. CARTIN, OF WATERTOWN, NEW YORK, ASSIGNOR TO THE NEW YORK AIR BRAKE COMPANY, A CORPORATION OF NEW JERSEY

AIR BRAKE

Application filed October 9, 1930. Serial No. 487,613.

This invention relates to air brakes, and particularly to apparatus known in the air brake art as ET equipment.

The ET equipment is used on locomotives to apply and release the engine and tender brakes, the air for applying the brakes being drawn directly from the main reservoir. The most important element of the ET equipment is the so-called distributing valve which consists of two portions, an equalizing portion which is in effect a triple valve responsive to pressure changes in the brake pipe, and the application portion which is in effect a pressure regulating valve having an application piston (so-called) subject on one side to pressures established by the equalizing portion just mentioned, and subject on the opposite side to brake cylinder pressure. The application piston operates two valves; one, the application valve which controls flow from the main reservoir to the brake cylinder to apply the brakes, and the other, the exhaust valve, which controls flow from the brake cylinder to atmosphere to release the brakes.

The application piston and the application and exhaust valves function to establish and maintain in the brake cylinder a pressure corresponding to the pressure established against the application piston by the equalizing portion. The application valve is customarily of the slide type and is held to its seat by main reservoir pressure. Consequently it must be housed in a chamber outside of the chamber in which brake cylinder pressure exists. This fact requires that the application valve be offset relatively to the stem of the piston.

Structures of this general character are illustrated in a number of patents; for example, the following three patents to Walter V. Turner:—1,109,175, in which the piston is numbered 8 and the offset application valve 11; 1,129,318, in which the piston is numbered 78 and the application valve is the slide valve in the chamber numbered 81; 1,130,448, in which the piston is numbered 23 and the application valve is numbered 21.

A commercial embodiment of the ET distributing valve is fully illustrated and described in Instruction Pamphlet No. 5032, issued December 1927, by The New York Air Brake Company, and entitled No. 6 ET Locomotive Brake Equipment. Fig. 19 on page 50 of that pamphlet illustrates the commercial structure upon which the present invention is an improvement.

The purpose of the present invention is to improve the offset driving connection between the application piston and the application valve. The piston and its stem are guided for right line reciprocating movement. The intent is to have the valve seat for the sliding application valve absolutely parallel with this line of motion. Because of minor errors in machining and more commonly because of errors introduced in the course of repair operations, strict parallelism is not always had. Consequently it has been found desirable to permit the valve to have a slight angular motion, relatively to the axis of the piston stem, to the end that the valve may accommodate itself to any slight irregularities in the alignment of the seat.

The invention will now be described with reference to the accompanying drawing, in which Fig. 1 is a fragmentary view of a distributing valve; in this view the aplication valve mechanism is shown complete and the equalizing portion or triple valve portion is omitted.

Figure 1:
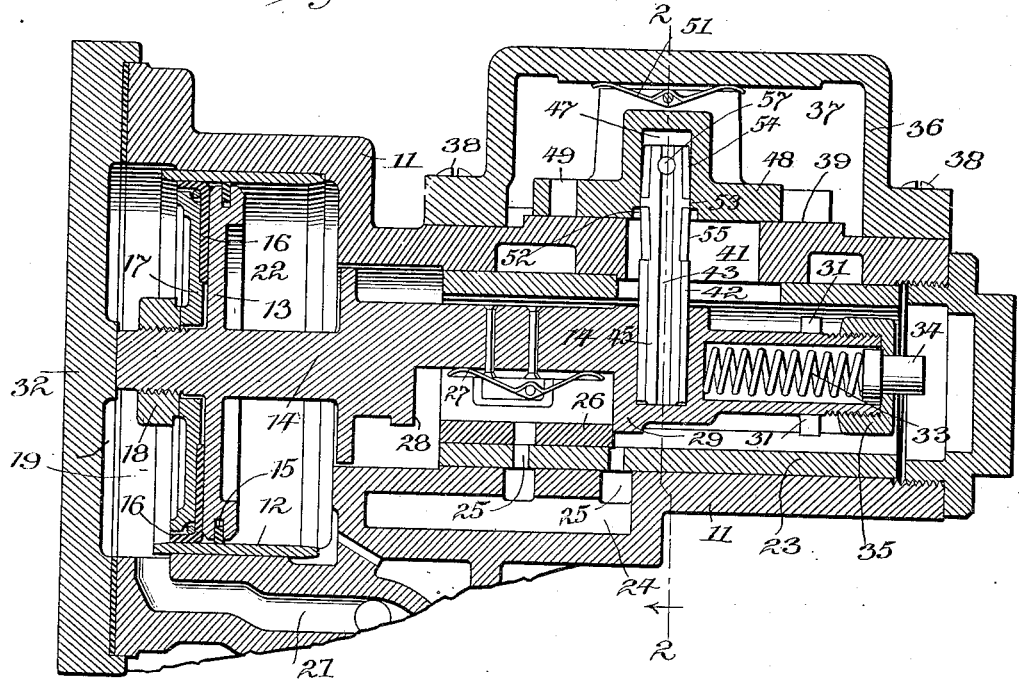

In the drawing, 11 represents the body casting of a distributing valve which has at one end an enlargement having a cylinder bushing 12. In this bushing slides a piston 13 having a stem 14 and an ordinary piston ring 15. As further insurance against leakage a cup leather 16 is mounted on the piston and is held in place by a retainer disc 17. This in turn, is clamped by a nut 18 threaded on the end of the stem 14.

The space 19 to the left of the piston 13 is connected by a port 21 with the equalizing portion. Through this port 21 air flows to and from the space 19 under the control of the equalizing portion. As has been suggested, the equalizing portion is in effect a triple valve and functions, in response to changes in brake pipe pressure, to establish in the chamber 19 pressures which correspond to the brake cylinder pressures throughout the train.

The space 22 to the right of the piston 13 is subject to brake cylinder pressure, as is the space within the valve-chamber bushing 23. 24 is an exhaust passage which communicates with exhaust ports 25 in the bushing 23. These ports are controlled by a slide valve 26 which is held to its seat by a bow spring 27 reacting against the stem 14. The valve 26 has lost motion relatively to the stem 15, such motion being limited by the shoulders 28 and 29.

The right end of the stem 14 is guided for right line motion in the bushing 23 by a spider having lugs 31. These lugs, as illustrated, are behind the plane of section, and, therefore, do not appear to contact the bushing 23, but as a matter of fact, they and similar lugs forward of the plane of section do enter into sliding engagement with the bushing and function to maintain the alignment of the stem 14 and confine the stem to strict longitudinal reciprocation. The parts are shown in release position, that is, with the piston 13 to the left at its limit of motion against the cylinder head 32.

The right end of the stem 14 is hollow to receive a spring 33 and a yielding stop 34 retained by a cap nut 35. The spring and yielding stop function to assist in the shifting of the piston 13 and rod 14 to lap position after an application.

Mounted on the upper portion of the distributing valve body 11 is the application valve housing 36 which is connected to the main reservoir so that the space 37 within this housing is subject to main reservoir pressure. The housing 36 is held in place by screws 38 as shown.

Figures 3, 4, 5, 6:
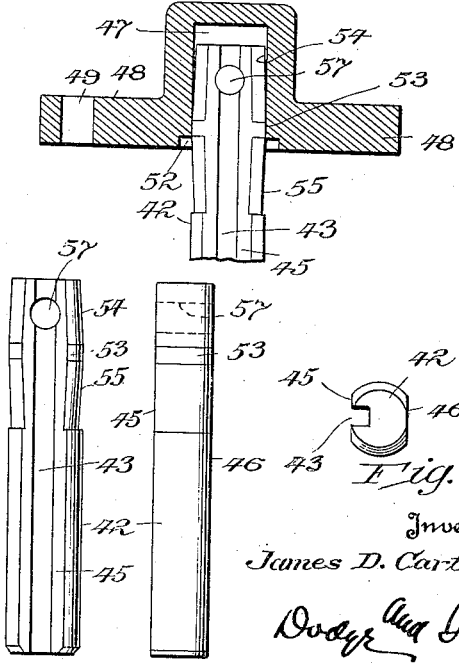
Fig. 3 is a fragmentary view of a portion of Fig. 1 on a slightly enlarged scale.
Figs. 4, 5 and 6 are, respectively, face, side and end elevations of the driving pin.

Formed on the upper portion of the body 11 within the housing 36 is the application valve seat 39 which is provided with an elongated slot 41 in which reciprocates the driving pin represented generally by the numeral 42. This pin makes a tight slip fit with a hole in the stem 14. Correct assembly is insured by a longitudinal slot 43 formed in the driving pin 42 and receiving a guide pin 44 mounted in the stem 14. It will be observed from Fig. 6 that the driving pin 42 is of generally cylindrical contour with two opposed flat sides 45 and 46, in one of which the groove 43 is formed.

The upper end of the driving pin 42 enters a cylindrical opening 47 in the application slide valve 48. This slide valve works on the seat 39 and is provided with an admission port 49 through which main reservoir air flows to the brake-cylinder chamber 22 by way of slot 41 (which also serves as a seat port), when the piston 13 moves to its right hand position. Chamber 22, as has been stated, is in communication with the brake cylinders on engine and tender. The slide valve 48 is held to its seat by a bow spring 51 which is in sliding engagement with the housing 36. Heretofore the upper end of the driving pin 42 has had parallel sides, as illustrated, for example, in the Turner patents mentioned, and in the Instruction Pamphlet above identified. Unless a very loose and unsatisfactory fit was used, no opportunity was afforded for the valve 48 to accommodate itself to misalignment of the seat 39.

The present invention is designed to overcome this difficulty. The valve 48 is formed with a relief recess 52 in its lower face as heretofore. The driving pin 42 is so formed that it engages the valve 48 only over a very limited length of the driving pin. The area of engagement consists of a peripheral zone 53 which is immediately above the relief recess 52. Both above and below the zone 53 the driving pin is tapered slightly as indicated at 54 and 55. The dimension of the zone 53 measured in the direction of the length of the pin 42 is of the order of one-eighth of an inch in valves of present commercial size. The taper of the portions 54 and 55 is very slight and is of the order of one degree and forty-four minutes.

The value of the taper is arrived at as follows: Knowing the maximum allowable clearance between the zone 53 on the pin and the walls of the recess 47, it is possible to determine the maximum amount that the valve 48 may cant relatively to the pin 42. The angle of taper is so chosen that at this maximum angle of cant, the taper 54 will contact with the valve 38 throughout the entire length of the taper. The idea is to secure the maximum contact area in the least favorable position in the valve 48, that is, in the position in which it is most canted.

It is desirable that the zone 53 on the pin be as close as possible to the plane of sliding contact between the valve 48 and the valve seat 39. For manufacturing reasons it is desirable to have the relief recess 52, but this is made as shallow as is reasonably practicable.

It follows from the construction just outlined that the valve 42 is driven adjacent its plane of resistance and is free to tilt to accommodate itself to misalignment of the valve seat.

Figure 2:
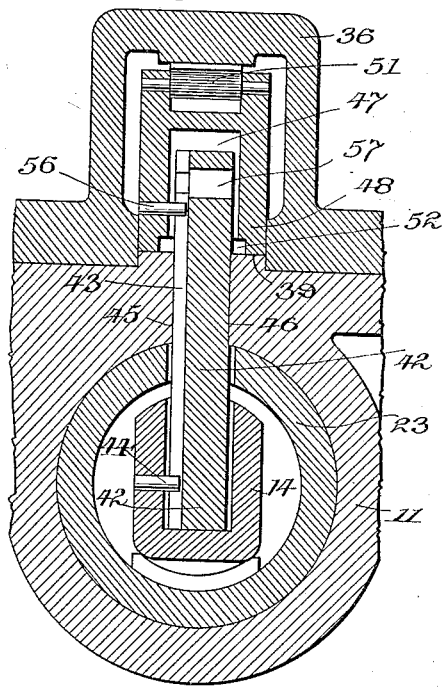
Fig. 2 is a section on the line 2—2 of Fig. 1.

To preclude erroneous assembly of the parts there is a guide pin 56 in recess 47 (see Fig. 2) which, like the pin 44, enters the slot 43. The hole 57 which is formed at the upper end of the pin 42 offers means for engaging the pin 42 to withdraw it from the hole in the stem 14. It must be withdrawn to dismount the device.

While I prefer the straight taper portions 54 and 55 above described, and while I prefer to locate the zone of contact 53 as near the face of the valve seat 39 as is practically possible, it is apparent that approximately equivalent results might be secured by other arrangements. Hence, no limitation to the exact construction is implied by the detailed description given.

I claim:—

1 The combination of a rod; means for guiding the same in longitudinal reciprocations; a valve seat substantially parallel with the path of such reciprocation and having a longitudinal slot; a slide valve slidable on said seat, and having in its face a recess which overlies said slot; and a driving connection between said rod and valve comprising a pin rigidly mounted in said rod, and extending laterally through said slot and into the recess in said valve, said pin having a narrow bearing portion fitting said recess with a working clearance, and at least one tapered portion adjacent said bearing area, the taper approximating the angle of valve tilt permitted by the maximum allowable working clearance.

2. The combination of claim 1, further characterized in that the recess in the valve is of circular cross section, and that the pin, including the bearing area and taper is of circular cross section with its sides cut away.

In testimony whereof I have signed my name to this specification.

JAMES D. CARTIN.